(12) United States Patent
Carvalho et al.

(10) Patent No.: US 8,133,027 B2
(45) Date of Patent: Mar. 13, 2012

(54) INTEGRATED ACTUATOR FOR A PROPELLER SYSTEM

(75) Inventors: Paul A. Carvalho, Westfield, MA (US); David V. Arel, Richmond, VA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 416 days.

(21) Appl. No.: 12/422,914

(22) Filed: Apr. 13, 2009

(65) Prior Publication Data

US 2010/0008779 A1    Jan. 14, 2010

Related U.S. Application Data

(60) Provisional application No. 61/134,841, filed on Jul. 14, 2008.

(51) Int. Cl.
*B64C 11/06* (2006.01)
*B64C 11/02* (2006.01)

(52) U.S. Cl. ............ 416/147; 416/1; 416/110; 416/155; 416/156; 416/157 A; 416/157 B; 416/158; 416/162; 416/164

(58) Field of Classification Search ............... 416/1, 110, 416/147, 155, 156, 157 A, 157 B, 157 R, 416/158, 162, 164
See application file for complete search history.

(56) References Cited

U.S. PATENT DOCUMENTS

| | | |
|---|---|---|
| 3,575,529 A | 4/1971 | Bierman |
| 3,589,830 A | 6/1971 | Mogren |
| 3,589,832 A | 6/1971 | Harris |
| 3,751,993 A | 8/1973 | Davis |
| 3,831,615 A | 8/1974 | Hartzell |
| 4,029,434 A | 6/1977 | Kenney |
| 4,197,053 A | 4/1980 | Reinke |
| 4,556,366 A | 12/1985 | Sargisson et al. |
| 4,648,798 A | 3/1987 | Voisard |
| 4,704,067 A | 11/1987 | Fisher |
| 4,750,862 A | 6/1988 | Barnes et al. |
| 4,842,484 A | 6/1989 | Johnson |
| 4,928,241 A | 5/1990 | Day |
| 4,930,725 A | 6/1990 | Thompson et al. |
| 4,958,289 A | 9/1990 | Sum et al. |
| 4,970,860 A | 11/1990 | Mezger et al. |
| 4,993,919 A | 2/1991 | Schneider |
| 5,154,372 A | 10/1992 | Hora et al. |
| 5,154,580 A | 10/1992 | Hora |
| 5,213,471 A | 5/1993 | Miller et al. |
| 5,263,898 A | 11/1993 | Elston, III et al. |

(Continued)

FOREIGN PATENT DOCUMENTS

EP    1832509    9/2007

(Continued)

OTHER PUBLICATIONS

UK Combined Search and Examination Report mailed Nov. 6, 2009.

*Primary Examiner* — Asok Sarkar
(74) *Attorney, Agent, or Firm* — Carlson Gaskey & Olds P.C.

(57) ABSTRACT

A propeller system includes a propeller hub which supports a multiple of propeller blades. A tailshaft extends from a propeller hub portion of the propeller hub along an axis of rotation with a propeller pitch change yoke mounted within the propeller hub for movement along an axis of rotation to change a pitch of the multiple of propeller blades, the propeller pitch change yoke in sliding engagement with the tailshaft.

13 Claims, 1 Drawing Sheet

U.S. PATENT DOCUMENTS

| | | |
|---|---|---|
| 5,391,055 A | 2/1995 | Carvalho |
| 5,415,523 A | 5/1995 | Muller |
| 5,489,189 A | 2/1996 | Schafer et al. |
| 5,554,003 A | 9/1996 | Hall |
| 5,599,215 A | 2/1997 | Jarvinen |
| 5,967,749 A | 10/1999 | Eaves et al. |
| 6,196,797 B1 | 3/2001 | Bogden et al. |
| 6,279,852 B1 | 8/2001 | Dusserre-Telmon et al. |
| 6,422,816 B1 | 7/2002 | Danielson |
| 6,464,172 B1 | 10/2002 | Schneidewind |
| 6,511,292 B2 | 1/2003 | Perkinson et al. |
| 6,711,376 B2 | 3/2004 | Suzuki et al. |
| 6,753,513 B2 | 6/2004 | Goldberg et al. |
| 6,811,376 B2 | 11/2004 | Arel et al. |
| 6,981,844 B2 | 1/2006 | Perkinson et al. |
| 7,172,391 B2 | 2/2007 | Carvalho |
| 7,296,969 B2 | 11/2007 | Raes et al. |
| 7,422,419 B2 | 9/2008 | Carvalho |
| 7,473,076 B2 | 1/2009 | Rosenkranz |

FOREIGN PATENT DOCUMENTS

| | | |
|---|---|---|
| EP | 1832510 | 9/2007 |
| EP | 2003055 | 12/2008 |
| GB | 2406884 | 4/2005 |

INTEGRATED ACTUATOR FOR A PROPELLER SYSTEM

The present invention claims the benefit of U.S. Provisional Patent Application No. 61/134,841, filed Jul. 14, 2008.

BACKGROUND

The present disclosure relates to a propeller system, and more particularly to a structure therefor.

Existing hydraulic pitch change propeller systems utilizes a pitch change actuator with a piston which translates in a hydraulic cylinder. The piston is attached to a translating yoke which changes propeller blade pitch through offset blade pins and bearings. Neither the hub nor the gearbox propshaft are used in the accomplishment of the pitch change actuation functionality.

SUMMARY

A propeller system according to an exemplary aspect of the present disclosure includes a propeller hub which supports a multiple of propeller blades. A tailshaft extends from a propeller hub portion along an axis of rotation. A propeller pitch change yoke is mounted within the propeller hub for movement along the axis of rotation to change a pitch of the multiple of propeller blades, the propeller pitch change yoke in sliding engagement with the tailshaft.

A pitch change system according to an exemplary aspect of the present disclosure includes a propeller hub that includes a tailshaft which extends from a propeller hub portion along an axis of rotation. A propeller pitch change yoke mounted within the propeller hub for movement along the axis of rotation, the propeller pitch change yoke in sliding engagement with the actuator dome and the tailshaft to define an increase pitch change chamber and a decrease pitch change chamber.

A method of pitch change for a propeller system according to an exemplary aspect of the present disclosure includes sliding a propeller pitch change yoke within a propeller hub for movement along an axis of rotation, the propeller pitch change yoke in sliding engagement with a tailshaft which extends from a propeller hub portion of the propeller hub to define a pitch change chamber.

BRIEF DESCRIPTION OF THE DRAWINGS

Various features will become apparent to those skilled in the art from the following detailed description of the disclosed non-limiting embodiment. The drawing that accompanies the detailed description can be briefly described as follows.

DETAILED DESCRIPTION

Figure 1:
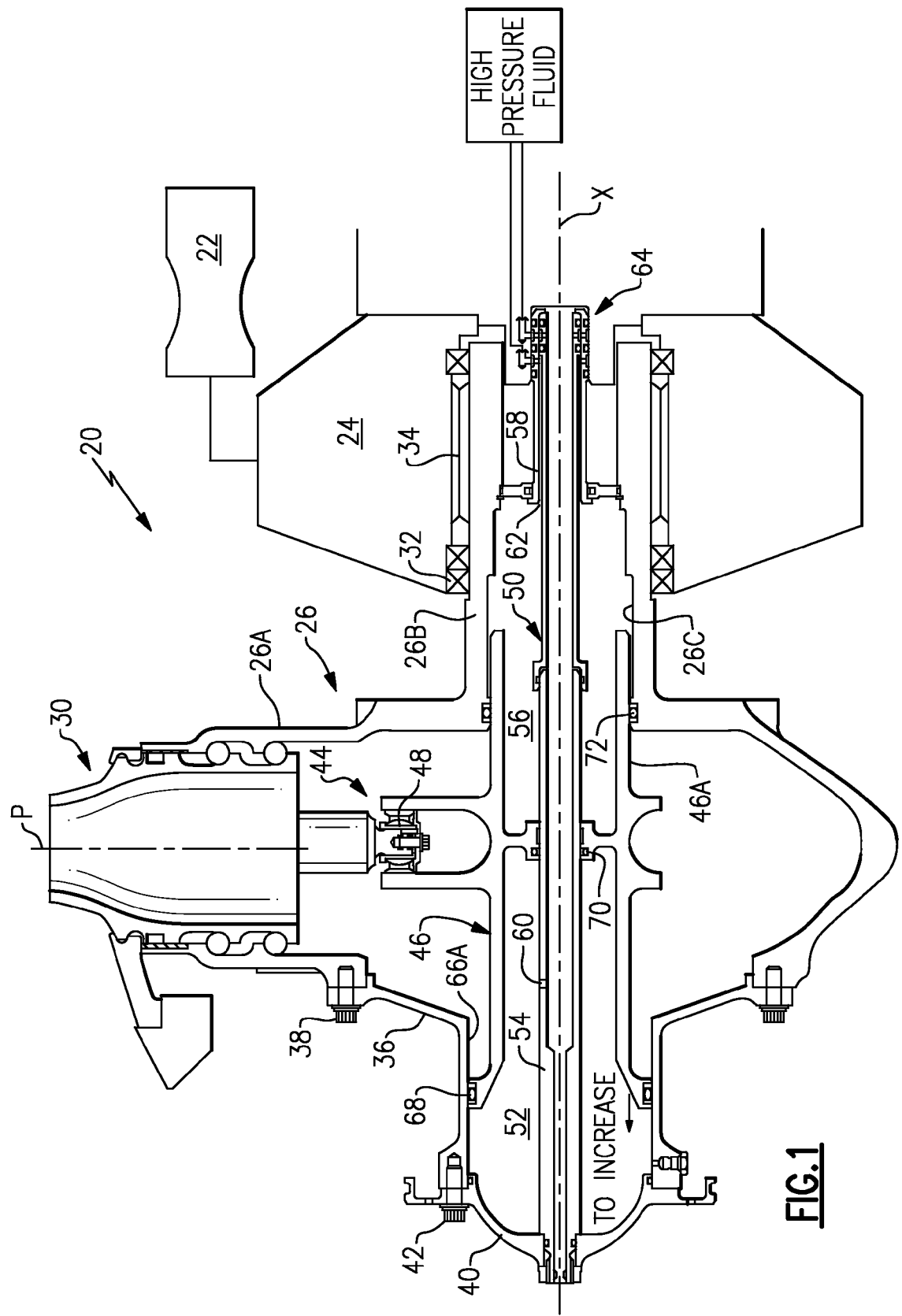
FIG. 1 is a schematic view of a propeller system according to one non-limiting embodiment.

FIG. 1 schematically illustrates a propeller system 20 such as that for an aircraft. It should be understood that although a propeller system typical of a turboprop aircraft is illustrated in the disclosed embodiment, various aircraft configurations and/or machines such as compound aircraft, turbo-props, tilt-rotors and other machines such as wind turbines will benefit from the present disclosure.

The propeller system 20 in one non-limiting embodiment is powered by a gas turbine engine 22 (illustrated schematically) to drive a gearbox 24 which decreases rotational speed and increase output torque. The gearbox 24 drives a propeller hub 26 about a propeller axis of rotation X with a plurality of propeller blades 30 which extend therefrom, each propeller blade 30 is defined along a propeller blade axis P transverse to the axis of rotation X. It should be understood that propeller blades 30 as utilized herein include various aerodynamic surfaces such as blades, rotors, prop-rotors and others.

The propeller hub 26 integrates a propeller hub portion 26A with a tailshaft 26B. The tailshaft 26B is engaged with and is driven by the gearbox 24. The tailshaft 26B is supported by bearings 32 and is driven by the gearbox 24 through, for example, a splined interface 34. The tailshaft 26B extends along axis X and is integral with the propeller hub portion 26A. The gearbox 24 engages the tailshaft 26B to rotate the propeller hub 26. An actuator dome 36 is mounted to the propeller hub portion 26A with a multiple of fasteners 38. An actuator dome cap 40 is mounted to the actuator dome 36 with a multiple of fasteners 42 to seal the actuator dome 36.

Each of the multiple of propeller blades 30 is pitched through a respective pitch change linkage 44 in response to axial movement of a propeller pitch change yoke 46 which is connected thereto. The propeller pitch change yoke 46 receives a pitch trunnion 48 of the pitch change linkage 44 which extends from each propeller blade assembly 30. The pitch trunnion 48 is offset from the blade axis P such that as the propeller pitch change yoke 46 transits axially along axis X, the pitch trunnion 48 is rotated in an arcuate manner about axis P to effectuate a pitch change in each propeller blade 30.

An oil transfer tube assembly 50 selectively communicates a high pressure fluid such as a lubricating oil into a decrease pitch change chamber 52 defined by the actuator dome 36 and the propeller pitch change yoke 46 through a decrease pitch oil transfer tube 54 and into an increase pitch change chamber 56 defined by the propeller pitch change yoke 46 and the tailshaft 26B through an increase pitch oil transfer tube 58. A port 60 in the decrease pitch oil transfer tube 54 communicates fluid into the decrease pitch change chamber 52. A port 62 in the increase pitch oil transfer tube 58 communicates fluid into the increase pitch change chamber 56.

A transfer bearing 64 defines a bearing interface and a high pressure seal which accommodates relative rotation between the rotation of the tailshaft 26B and the oil transfer tube assembly 50. It should be understood that various rotational interface may benefit herefrom like a close fitting journal bearing. The transfer bearing 64 selectively direct high pressure fluid into the respective decrease pitch oil transfer tube 54 and the increase pitch oil transfer tube 58 to axially position the propeller pitch change yoke 46 along axis X. Blade counterweights bias the propeller blades 30 toward increase pitch which corresponds to a maximum actuator area within the decrease pitch change chamber 52 (to the left in the FIGURE).

An inside diameter 66A of the actuator dome 36 operates as the pitch change actuator hydraulic cylinder for the propeller pitch change yoke 46. The inside diameter 66A of the actuator dome 36 is machined to a smooth surface finish and may be coated with a wear resistant, low friction coating to facilitate sliding movement of the propeller pitch change yoke 46 thereon. A dynamic seal 68 is supported on the propeller pitch change yoke 46 to ride upon the inside diameter 66A to change a volume of the decrease pitch change chamber 52. Dynamic seals 70 and 72 are also arranged to seal the fluid between the propeller pitch change yoke 46 and the respective decrease pitch change chamber 52 and increase pitch change chamber 56.

Alternatively or additionally, the tailshaft 26B may also be machined to a smooth surface finish and may be coated with a wear resistant, low friction coating to facilitate sliding movement of the propeller pitch change yoke 46 thereon.

It should be understood that other chamber arrangements may alternatively be provided. For instance, an aft section 46A of the propeller pitch change yoke 46 may alternatively contain a translating seal, like 68 on the forward end of the yoke, and translate upon an inside diameter 26C of the tailshaft 26B.

By using structural components such as the tailshaft 26B to serve a multiple of functions, system components may be eliminated to reduce weight and complexity which thereby facilitates an increase in reliability.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A propeller system comprising:
a multiple of propeller blades;
a propeller hub which supports said multiple of propeller blades, said propeller hub includes a tailshaft which extends from a propeller hub portion along an axis of rotation;
a propeller pitch change yoke mounted within said propeller hub for movement along said axis of rotation to change a pitch of said multiple of propeller blades, said propeller pitch change yoke in sliding engagement with said tailshaft;
an actuator dome mounted to said propeller hub portion, said propeller pitch change yoke in sliding engagement with said actuator dome; and
a dynamic seal supported on said propeller pitch change yoke to ride upon an inside diameter of said actuator dome.

2. The system as recited in claim 1, wherein said tailshaft directly engaged with a gearbox.

3. The system as recited in claim 1, wherein said tailshaft and said propeller hub portion are one component, said tailshaft directly engaged with a gearbox operable to drive said propeller hub.

4. The system as recited in claim 1, wherein said multiple of propeller blades extend from said propeller hub portion transverse to said axis of rotation.

5. A propeller system comprising:
a multiple of propeller blades;
a propeller hub which supports said multiple of propeller blades, said propeller hub includes a tailshaft which extends from a propeller hub portion along an axis of rotation;
a propeller pitch change yoke mounted within said propeller hub for movement along said axis of rotation to change a pitch of said multiple of propeller blades, said propeller pitch change yoke in sliding engagement with said tailshaft; and
a seal supported within said tailshaft, said propeller pitch change yoke slidably sealed to said tailshaft through said seal.

6. A propeller system comprising:
a multiple of propeller blades;
a propeller hub which supports said multiple of propeller blades, said propeller hub includes a tailshaft which extends from a propeller hub portion along an axis of rotation;
a propeller pitch change yoke mounted within said propeller hub for movement along said axis of rotation to change a pitch of said multiple of propeller blades, said propeller pitch change yoke in sliding engagement with said tailshaft; and
an inner diameter of said tailshaft defines an increase pitch change chamber with said propeller pitch change yoke.

7. The system as recited in claim 6, wherein said inner diameter of said tailshaft is machined to a smooth surface finish.

8. The system as recited in claim 7, wherein said smooth surface finish is coated with a wear resistant low friction coating.

9. A pitch change system comprising:
a propeller hub that includes a tailshaft which extends from a propeller hub portion along an axis of rotation;
an actuator dome mounted to said propeller hub portion; and
a propeller pitch change yoke mounted within said propeller hub for movement along said axis of rotation, said propeller pitch change yoke in sliding engagement with said actuator dome and said tailshaft to define an increase pitch change chamber and a decrease pitch change chamber.

10. The system as recited in claim 9, further comprising a seal supported within said tailshaft and a dynamic seal supported on said propeller pitch change yoke to ride upon an inside diameter of said actuator dome, said propeller pitch change yoke slidably sealed by said seal and said dynamic seal to define said increase pitch change chamber and said decrease pitch change chamber.

11. The system as recited in claim 9, wherein said inner diameter of said tailshaft and an inside diameter of said actuator dome are machined to a smooth surface finish.

12. A method of pitch change for a propeller system comprising:
sliding a propeller pitch change yoke within a propeller hub for movement along an axis of rotation, the propeller pitch change yoke in sliding engagement with a tailshaft which extends from a propeller hub portion of the propeller hub to define a pitch change chamber.

13. A method as recited in claim 12, further comprising:
engaging the tailshaft with a gearbox; and
rotating the propeller hub about the axis of rotation with the gearbox.

* * * * *